Patented Jan. 8, 1924.

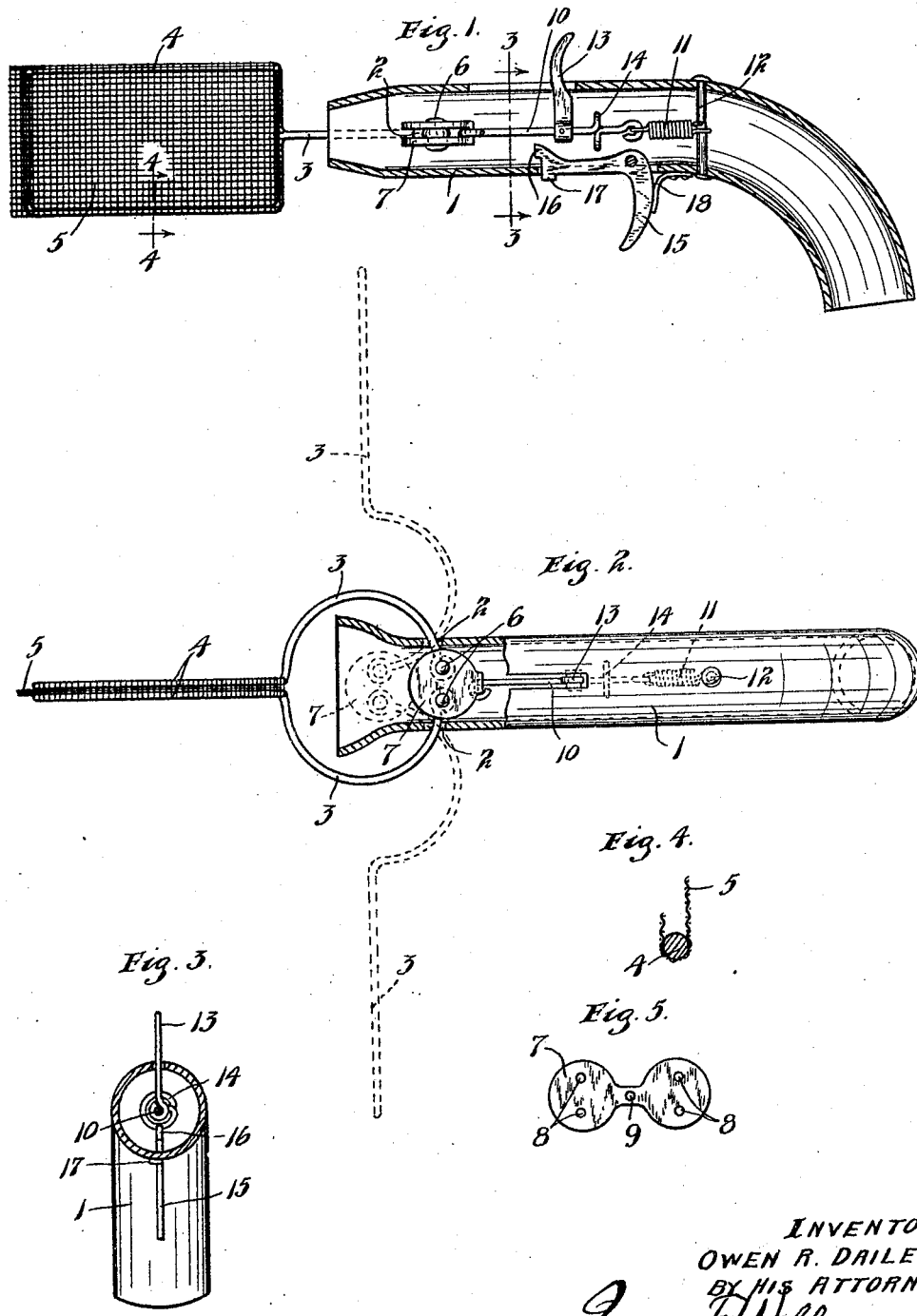

1,480,245

UNITED STATES PATENT OFFICE.

OWEN R. DAILEY, OF NICHOLS, WISCONSIN.

DEVICE FOR CATCHING FLIES OR OTHER INSECTS.

Application filed September 29, 1922. Serial No. 591,402.

*To all whom it may concern:*

Be it known that I, OWEN R. DAILEY, a citizen of the United States, residing at Nichols, in the county of Outagamie and State of Wisconsin, have invented certain new and useful Improvements in Devices for Catching Flies or Other Insects; and I do hereby declare the following to be a full, clear, and exact description of the invention, such as will enable others skilled in the art to which it appertains to make and use the same.

This invention relates to a device for catching and destroying flies and other insects. Such flies and insects are often annoying in locations where it is difficult or undesirable to use a fly swatter for killing them, as for instance, about a dining table or about places where food is being prepared.

It is an object of this invention to provide a fly or insect catching device which can be moved close to the fly and operated to catch the same without knocking the fly into an undesirable place.

It is a further object of the invention to provide such a device in a small gun-like form, which device has reticulate members adapted to move toward and from each other and between which the fly or other insect is caught.

More specifically, it is an object of the invention to provide such a device having flat screen-covered frames which are moved together by resilient means, which means can be held under tension and released by a trigger device to quickly move said frames together.

These and other objects and advantages of the invention will be fully set forth in the following description made in connection with the accompanying drawings in which like reference characters refer to the same parts throughout the different views, and in which—

Fig. 1 is a view in central longitudinal section of the device;

Fig. 2 is a plan view partly in section, showing in dotted lines an extended position of the device;

Fig. 3 is a vertical section on the line 3—3 of Fig. 1, as indicated by the arrows;

Fig. 4 is a section on the line 4—4 of Fig. 1, as indicated by the arrows; and

Fig. 5 is a developed plan view of one of the parts of the device.

Referring to the drawings, a barrel or tube 1, which preferably will be made of thin sheet metal, is provided which is bent at one end to form a convenient handle or grip. Said barrel is flattened somewhat at its forward end and provided with oppositely disposed apertures 2 adjacent said end through which project the curved and oppositely disposed arms 3 formed at their outer ends into flat frames 4 illustrated as of rectangular shape. The frames 4 are covered with reticulate material 5, preferably in the form of ordinary fly screen, which screen is also of rectangular shape and has three of its edges bent parallel with the main body thereof, as shown in Fig. 4. Said screens can thus be easily slid onto the frames 4 and can be easily moved thereon or removed therefrom. The inner ends of the arms 3 are formed with eyes pivotally connected to vertical pivot members 6 extending between parallel sides of a member 7. The member 7 is preferably made from a blank, such as shown in Fig. 5, comprising two substantially circular members connected by a central narrow strip. These members are bent into parallel relation, as shown in Fig. 1, and the vertical pivots 6 passed through holes 8 therein, said pivots, as illustrated, being riveted at each side of the member 7. The member 7 also has an aperture 9 through its rear portion and a wire or rod 10 is connected at one end through said aperture and is connected at its other end to an extensile coiled spring 11, the rear end of which is connected to a vertical pin 12 passing through the barrel 1 and riveted at the outside surfaces thereof. The member 10 is formed with a vertical loop 14 somewhat adjacent its rear end and is provided in front of said loop with a vertical handle or finger-piece 13 provided with a rearwardly curved projection extending through a slot formed in the upper side of the barrel 1. The barrel 1 is provided with a trigger member having a finger-piece 15 normally urged into the position shown in Fig. 1 by a spring 18 secured to the underside of the barrel. The said trigger has a forwardly extending arm provided with a stop portion 16 at its forward end over which the member 14 is adapted to engage. The said arm is curved downwardly from the top of the portion 16 so that as the member 14 moves forwardly the arm will be depressed and will rise in the rear of said member. The forwardly extending arm of the trigger is prevented from extending too far into the barrel by the laterally bent portion 17 contacting with the bottom of the barrel.

Normally, the parts of the device will occupy the position shown in Fig. 1. When it is desired to operate the same the device will be held in the hand and the member 13 may be pushed forwardly by the thumb or one of the fingers of the same hand, or, if desired, said member may be moved by the other hand. When said member is moved forwardly, the portion 14 will catch in front of the stop member 16 and the spring 11 will be held in extended tensioned position. The arms 3 are formed of spring material and as the member 7 moves forwardly, these arms will swing and spring into the position shown in dotted lines in Fig. 2. The device is now moved adjacent to the fly which it is desired to catch and when in sufficiently close position thereto the trigger 15 is operated. The member 14 will be released and the spring 11 will swing the member 7 and arms 3 rearwardly, thus quickly swinging frames 4 together. The fly will thus be caught between the screens on the frames 4. The device is usually held just above the level of the fly so that if the same starts to fly, owing to the movement of the device, it will thus be caught between the screens. The action of the frames 4 in approaching each other is quite rapid and yet the same are arranged so that they will not unduly crush the insect. The device can be quickly reset and the operations repeated in quick succession. The screens 5 can be easily slid on the frames 4 and thus easily adjusted or removed when it is desired to replace the same.

From the above description it is seen that applicant has provided a very simple and efficient fly catching device and one that can be made at a very low cost. The device, as previously stated, is very useful in catching and removing flies from places where it is undesirable or impossible to strike the same with an ordinary fly swatter. The device also forms an interesting toy for children, as well as a very useful article for the purpose above described. The invention has been amply demonstrated in actual practice and found to be very efficient.

It will, of course, be understood that various changes may be made in the form, details and arrangement of the parts without departing from the scope of applicant's invention, which, generally stated, consists in the matter shown and described and set forth in the appended claims.

What is claimed is:

1. A fly catching device in a form of a gun, comprising a barrel, a member movable in said barrel, a pair of reticulate members pivoted to said movable member for movement toward and from each other, resilient means for suddenly moving said movable member, means for holding said means under tension and suddenly releasing the same and a cam action device for suddenly moving said reticulate members together when said resilient means are released.

2. A device for catching flies and other insects having in combination, a pair of reticulate members, pivots about which said members swing toward and from each other, a movable member carrying said pivots, means by which said movable member may be moved in one direction to separate said reticulate members, and means for moving said movable member in the other direction to quickly move said reticulate members together.

3. A fly catching device comprising a pair of screen covered frames mounted for movement toward and from each other, a barrel member, resilient means in said barrel connected to said frames, means for extending said resilient means to move said frame members to separated position, and means for holding said resilient means extended and for releasing the same whereby the said frames are moved together.

4. A fly catching device having in combination, a tube, oppositely disposed apertures therethrough adjacent one end thereof, spring arms extending through said apertures and having screen covered frames at their outer ends, a member movable in said tube to which said arms are pivoted, resilient means connected to said member tending normally to move said arms to swing said frames together, means for holding said resilient means under tension and for releasing the same to move said frames together.

5. A fly catching device comprising a barrel, a pair of spring arms carrying flat screen covered frames at their outer ends and having their inner ends passing into said tube, a member movable in said barrel to which said arms are connected, a rod connected to said member, an extensile spring connected at one end to said barrel and at its other end to said rod, and a trigger device for holding said spring extended and for releasing the same.

6. The structure set forth in claim 5, said rod having means thereon engaging over said trigger member to hold said spring extended and also having means thereon for moving the same to extend said spring.

In testimony whereof I affix my signature.

OWEN R. DAILEY.